US010604417B2

(12) United States Patent
Zhang et al.

(10) Patent No.: US 10,604,417 B2
(45) Date of Patent: Mar. 31, 2020

(54) LANTHANIDE FLUORIDE TWO-DIMENSIONAL POROUS NANOSHEETS, AND PREPARATION METHOD AND APPLICATIONS THEREOF

(71) Applicant: TIANJIN POLYTECHNIC UNIVERSITY, Tianjing (CN)

(72) Inventors: Yuzhong Zhang, Tianjing (CN); Leitao Zhang, Tianjing (CN); Hong Li, Tianjing (CN)

(73) Assignee: TIANJIN POLYTECHNIC UNIVERSITY, Tianjing (CN)

( * ) Notice: Subject to any disclaimer, the term of this patent is extended or adjusted under 35 U.S.C. 154(b) by 0 days.

(21) Appl. No.: 16/457,892

(22) Filed: Jun. 28, 2019

(65) Prior Publication Data
US 2019/0322541 A1 Oct. 24, 2019

Related U.S. Application Data

(63) Continuation of application No. PCT/CN2018/089562, filed on Jun. 1, 2018.

(30) Foreign Application Priority Data

Feb. 9, 2018 (CN) .......................... 2018 1 0131999

(51) Int. Cl.
*C01F 17/00* (2020.01)
*B01D 53/02* (2006.01)
(Continued)

(52) U.S. Cl.
CPC .......... *C01F 17/0062* (2013.01); *B01D 53/02* (2013.01); *B01J 20/0207* (2013.01);
(Continued)

(58) Field of Classification Search
CPC ................ C01F 17/0062; B01D 53/02; B01D 2253/112; B01J 20/0207; B01J 20/027;
(Continued)

(56) References Cited

FOREIGN PATENT DOCUMENTS

| CN | 101348274 A | 1/2009 |
|----|-------------|--------|
| CN | 102153128 A | 8/2011 |

(Continued)

OTHER PUBLICATIONS

Lijuan Wang, et al., "Fabrication of silver nanoparticles loaded flowerlike CeF3 architectures and their antibacterial activity." Journal of Physics and Chemistry of Solids 120, pp. 154-160. (Year: 2018).*

(Continued)

*Primary Examiner* — Patricia L. Hailey
(74) *Attorney, Agent, or Firm* — J.C. Patents

(57) ABSTRACT

The present application provides a method for preparing lanthanide fluoride two-dimensional porous nanosheets and belongs to the field of novel materials. In the present application, mixing a water-soluble lanthanide metal salt and an aqueous solution of sodium acetate in a nitrogen atmosphere to obtain a mixed solution, and adding an aqueous solution of fluorine-containing salt to the mixed solution obtained for precipitation reaction to produce lanthanide fluoride two-dimensional porous nanosheets. In the preparation process provided by the present application, no additional surfactant or template agent needs to be added, the pollution of the surfactant to the surface of the prepared material is avoided and the tedious after-treatment steps to template agent are reduced. Accordingly, the large-scale production can be realized, and the lanthanide fluoride two-dimensional porous nanosheets constructed by nanoparticles are prepared in large scale by one step. Moreover, (Continued)

no other organic solvents are required, and the pollution to the environment during the preparation process is avoided.

18 Claims, 4 Drawing Sheets

(51) Int. Cl.

| | | |
|---|---|---|
| *B01J 20/02* | (2006.01) | |
| *B01J 20/28* | (2006.01) | |
| *B01J 20/30* | (2006.01) | |
| *B01J 27/12* | (2006.01) | |
| *B01J 35/00* | (2006.01) | |
| *B01J 35/10* | (2006.01) | |
| *B01J 37/04* | (2006.01) | |
| *B01J 37/26* | (2006.01) | |
| *H01M 4/58* | (2010.01) | |
| *B82Y 30/00* | (2011.01) | |
| *B82Y 40/00* | (2011.01) | |

(52) U.S. Cl.
CPC ....... *B01J 20/027* (2013.01); *B01J 20/28007* (2013.01); *B01J 20/2808* (2013.01); *B01J 20/28016* (2013.01); *B01J 20/28083* (2013.01); *B01J 20/3085* (2013.01); *B01J 27/12* (2013.01); *B01J 35/0013* (2013.01); *B01J 35/1057* (2013.01); *B01J 35/1061* (2013.01); *B01J 37/04* (2013.01); *B01J 37/26* (2013.01); *H01M 4/582* (2013.01); *B01D 2253/112* (2013.01); *B82Y 30/00* (2013.01); *B82Y 40/00* (2013.01); *C01P 2002/77* (2013.01); *C01P 2004/04* (2013.01); *C01P 2004/24* (2013.01); *C01P 2006/16* (2013.01)

(58) Field of Classification Search
CPC ............ B01J 20/28007; B01J 20/28016; B01J 20/2808; B01J 20/28083; B01J 20/20; B01J 20/3085; B01J 27/12; B01J 35/00163; B01J 35/1057; B01J 35/1061; B01J 37/04; B01J 37/26; B01J 2523/3712; B01J 2523/3718; B01J 2523/3725; B01J 2523/3775; B01J 2523/3787; H01M 4/582; B82Y 30/00; B82Y 40/00; C01P 2002/77; C01P 2004/04; C01P 2004/24; C01P 2006/16
USPC .................. 502/224; 977/700, 755, 758
See application file for complete search history.

(56) References Cited

FOREIGN PATENT DOCUMENTS

| | | |
|---|---|---|
| CN | 103641149 A | 3/2014 |
| CN | 106673045 A | 5/2017 |
| CN | 108358233 A | 8/2018 |

OTHER PUBLICATIONS

Wu, Kelu et al., "Sodium acetate assisted hydrothermal growth of dumbbell-like β-NaGdF4 nanobundles: Morphology control and products transformation" Chemical Physics Letters, vol. 682, (2017), pp. 101-107.

The Chinese Second Examination Report of corresponding Chinese application No. 201810131999.1, dated Aug. 1, 2019.

Bao, Feng et al., "Self-assembly of mono-crystalline NdF3 nanostructures during hydrothermal process" Materials Letters ; vol. 60 ; (Sep. 2005) ; pp. 389-392.

Han, Rongluo et al., "Synthsis and Characterization of Hexagonal-like SmF3: Eu3+ Nanocrystals" Journal of Zhejiang Sci-Tech University ; vol. 25, No. 2 ; (Mar. 2008) ; pp. 203-206 ; (English Abstract is provided).

Lin, Jintai et al., "Systematic studies for the novel synthesis of nano-structured lanthanide fluorides" Chemical Engineering Journal ; vol. 250 ; (Apr. 2014) ; pp. 190-197.

Novoselov, K. S. et al., "Electric Field Effect in Atomically Thin Carbon Films" Science ; vol. 306 ; (Oct. 2004) ; pp. 666-669.

Qian, Liwu et al., "Control of the morphology and composition of yttrium fluoride via a salt-assisted hygrothermal method" CrystEngComm ; vol. 12 ; (2010) ; pp. 199-206.

Tao, Feng et al., "Shape-Controlled Synthesis and Luminescence Properties of NdF3 Hexagonal Nanosheets" Journal of Synthetic Crystals ; vol. 44, No. 10 ; (Oct. 2015) ; pp. 2822-2827.

The International Search Report of corresponding international application No. PCT/CN2018/089562, dated Nov. 18, 2018.

The Chinese First Examination Report of corresponding Chinese application No. 201810131999.1, dated Apr. 3, 2019.

\* cited by examiner

LANTHANIDE FLUORIDE TWO-DIMENSIONAL POROUS NANOSHEETS, AND PREPARATION METHOD AND APPLICATIONS THEREOF

CROSS-REFERENCE TO RELATED APPLICATION

This application is a continuation of International Application No. PCT/CN2018/089562 filed on Jun. 1, 2018, which in turn claims the priority benefits of Chinese application No. 201810131999.1 filed on Feb. 9, 2018. The contents of these prior applications are hereby incorporated by reference in its entirety.

TECHNICAL FIELD

The present application relates to the technical field of the development of novel materials, and in particular to lanthanide fluoride two-dimensional porous nanosheets and a preparation method and applications thereof.

BACKGROUND OF THE PRESENT INVENTION

Since physicists Andre. K. Geim and Kostya. S. Novoselov from the University of Manchester have stripped graphene with adhesive tapes in 2004, the researches on two-dimensional materials have become a hot topic in the scientific community (see *Electric field effect in atomically thin carbon films*, Andre. K. Geim et al., Science. 2004, 306:666-669). In additional to common two-dimensional materials, perovskite, organic nanosheets, polypeptide molecules, DNA, etc., can become novel two-dimensional materials by particular methods.

At present, top-down approach and bottom-up methodology are two common methods for preparing two-dimensional materials. The top-down approach is mainly applicable to the preparation of two-dimensional materials with a layered bulk phase, while the bottom-up methodology is applicable to the synthesis of all two-dimensional materials. In the bottom-up methodology, the template method and the surfactant modulation growth method are two commonly methods for preparing two-dimensional materials. However, both of the preparation methods require tedious after-treatment steps to remove the template agent and the surfactant, so it is difficult to realize the large-scale preparation of two-dimensional materials.

SUMMARY OF THE PRESENT INVENTION

In view of this, an object of the present application is to provide a method for preparing two-dimensional nanosheets, the prepared lanthanide fluoride two-dimensional porous nanosheets and applications thereof. To achieve the above object, the present application provides the following technical solutions.

A method for preparing lanthanide fluoride two-dimensional porous nanosheets, comprising the following steps of:

(1) mixing a water-soluble lanthanide metal salt and an aqueous solution of sodium acetate in a nitrogen atmosphere to obtain a mixed solution; and (2) adding an aqueous solution of fluorine-containing salt to the mixed solution obtained in the step (1) for precipitation reaction to produce lanthanide fluoride two-dimensional porous nanosheets.

Preferably, the water-soluble lanthanide metal salt in the step (1) comprises one or more of nitrates, chlorates, chlorides and acetates of lanthanides.

Preferably, the water-soluble lanthanide metal salt is one or a mixture of more of cerium nitrate, cerium acetate, praseodymium chloride, lanthanum chlorate, neodymium chloride, ytterbium nitrate, erbium nitrate, praseodymium nitrate, neodymium nitrate, cerium chloride and praseodymium chlorate.

Preferably, the mixture is one of a mixture of cerium nitrate and praseodymium nitrate, a mixture of cerium nitrate, neodymium nitrate and erbium nitrate, a mixture of cerium chloride, praseodymium chloride and erbium nitrate and a mixture of lanthanum chlorate, cerium nitrate and neodymium nitrate.

Preferably, a molar ratio of the water-soluble lanthanide metal salt to the sodium acetate is in a range of 1:1 to 1:10.

Preferably, a concentration of the aqueous solution of fluorine-containing salt in the step (2) is in a range of 5 to 100 mg/mL.

Preferably, a molar ratio of the fluorine in the aqueous solution of fluorine-containing salt to the lanthanide in the mixed solution in the step (2) is in a range of 0.1-10:1.

Preferably, the fluorine-containing salt in the step (2) comprises one or more of ammonium fluoride, sodium fluoride, potassium fluoride, potassium fluoroborate, potassium fluorosilicate and tetrabutylammonium fluoride.

Preferably, a time for the precipitation reaction in the step (2) is in a range of 0.5 h to 24 h.

The present application also provides lanthanide fluoride two-dimensional porous nanosheets prepared by the preparation method in the above technical solution, wherein the lanthanide fluoride two-dimensional porous nanosheets are formed by alternately stacking fluorine-lanthanide metal monoatomic layers and interlayer acetates, and an average pore diameter of the lanthanide fluoride two-dimensional porous nanosheets is in a range of 0.1 to 30 nm.

Preferably, the average pore diameter of the lanthanide fluoride two-dimensional porous nanosheets is in a range of 0.1 to 10 nm.

Preferably, the lanthanide fluoride two-dimensional porous nanosheets are formed by assembling nanoparticles of 0.5-20 nm in diameter.

The present application also provides applications of the lanthanide fluoride two-dimensional porous nanosheets of the above technical solution in adsorption, catalysis, battery materials and gas separation.

In the preparation process provided by the present application, no additional surfactant or template agent needs to be added, thus the pollution of the surfactant to the surface of the prepared material is avoided and the tedious after-treatment steps to template agent are reduced. Accordingly, the large-scale production can be realized, and the lanthanide fluoride two-dimensional porous nanosheets constructed by nanoparticles are prepared in large scale by one step. Moreover, no other organic solvents are required, and the pollution to the environment during the preparation process is avoided.

Further, the lanthanide fluoride two-dimensional porous nanosheets prepared by the present application are two-dimensional porous nanosheets formed by assembling nanoparticles, and the control of material porosity is realized. The data in embodiments indicate that the lanthanide fluoride two-dimensional porous nanosheets prepared by the present application are formed by assembling nanoparticles of 0.5-20 nm in diameter, the average pore diameter of the lanthanide fluoride two-dimensional porous nanosheets is in a range of 0.1 to 30 nm, and the adsorption capacity for Congo red dye is in a range of 90 mg/g to 3051 mg/g.

BRIEF DESCRIPTION OF THE DRAWINGS

The present application will be further described below in detail by specific implementations with reference to the accompanying drawings.

Figure 1:
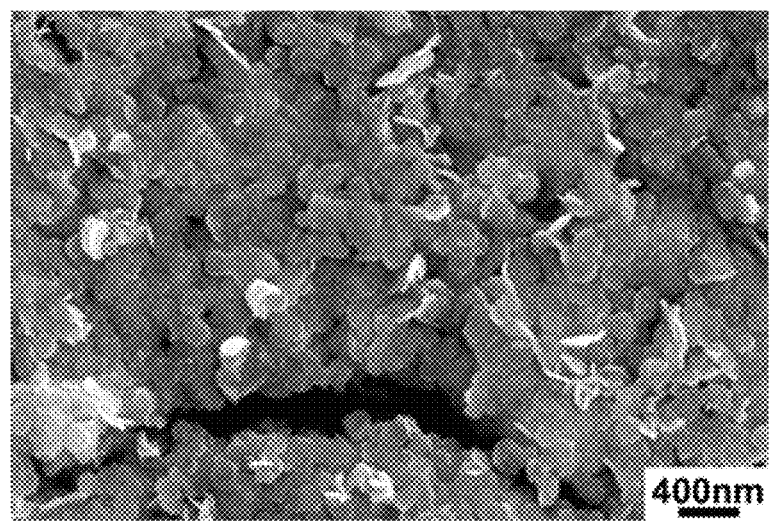
FIG. 1 is a field-emission electron microphotograph of cerium fluoride (F—Ce) two-dimensional porous nanosheets prepared by Embodiment 1 of the present application.

in which: 1: F—Ce atom layer; and, 2: acetate layer.

DETAILED DESCRIPTION OF EMBODIMENTS

One aspect of the present application provides a method for preparing lanthanide fluoride two-dimensional porous nanosheets, comprising the following steps of:

(1) mixing a water-soluble lanthanide metal salt and an aqueous solution of sodium acetate in a nitrogen atmosphere to obtain a mixed solution; and (2) adding an aqueous solution of fluorine-containing salt to the mixed solution obtained in the step (1) for a precipitation reaction to produce lanthanide fluoride two-dimensional porous nanosheets.

In the step (1), complexation reaction occurs between the lanthanide metal salt and the sodium acetate to generate complexes of acetate and metal cation.

In the step (1), the nitrogen may also be replaced with other inert gases such as argon. In addition, preferably, water is first added in a reactor, and then nitrogen is fed to remove air. By feeding nitrogen to water preferentially, dissolved oxygen in the water can be removed, so that metal ions are prevented from being oxidized by air after the addition of the metal salt.

In a preferred embodiment, the water-soluble lanthanide metal salt comprises one or more of nitrates, chlorates, chlorides and acetates of lanthanides, more preferably one or more of cerium nitrate, cerium acetate, praseodymium chloride, lanthanum chlorate, neodymium chloride, ytterbium nitrate, erbium nitrate, praseodymium nitrate, neodymium nitrate, cerium chloride and praseodymium chlorate. Most preferably, the mixture is one of a mixture of cerium nitrate and praseodymium nitrate, a mixture of cerium nitrate, neodymium nitrate and erbium nitrate, a mixture of cerium chloride, praseodymium chlorate and erbium nitrate and a mixture of lanthanum chlorate, cerium nitrate and neodymium nitrate. When the water-soluble lanthanide metal salt is a mixture, the amount of each water-soluble lanthanide metal salt in the mixture is not specifically limited in the present application, and a mixture in any ratio is usable. In the present application, the sodium acetate is not only a reactant but also regulate the structural morphology of the nano-material during the reaction process. The directional assembling of nanoparticles is guided by the directional arrangement of acetates in a solution and an interface, which would regulate the structural morphology of the nano-material without affecting the performance of the synthesized nano-material.

In a preferred embodiment, a molar ratio of the water-soluble lanthanide metal salt to the sodium acetate is in a range of 1:1 to 1:10. However, it should be understood that the molar ratio of the water-soluble lanthanide metal salt to the sodium acetate can also be 1:2, 1:4, 1:6, 1:9, etc., and can be selected from the above range by those skilled in the art according to the actual reaction conditions as long as the above objective can be achieved. To further facilitate the reaction process and give full play to the regulation effect of the sodium acetate, the molar ratio of the water-soluble lanthanide metal salt to the sodium acetate is preferably in a range of 1:3 to 1:8, further preferably in a range of 1:5 to 1:7.

In the embodiments of the present application, when a laboratory scheme is adopted, the water-soluble lanthanide metal salt and the aqueous solution of sodium acetate are preferably mixed in a three-necked flask. In the present application, the addition order of the water-soluble lanthanide metal salt and the aqueous solution of sodium acetate are not limited, and any addition order known to those skilled in the art can be adopted. Specifically, adding water in the three-necked flask firstly, then feeding nitrogen, and successively adding the water-soluble lanthanide metal salt and the aqueous solution of sodium acetate.

In a preferred embodiment, the nitrogen is fed for 5 min to 90 min. The nitrogen is used as a protective gas in the reaction. However, it should be understood that the nitrogen can also be fed for 50 min, 70 min, 80 min, etc., and the feeding time can be adjusted within the above range by those skilled in the art according to the actual reaction conditions. Further, the nitrogen is preferably fed for 10 min to 60 min, further preferably 20 min to 40 min and most preferably 40 min.

After the mixed solution is obtained by the step (1), in the step (2), an aqueous solution of fluorine-containing salt is added into the mixed solution to perform a precipitation reaction to produce lanthanide fluoride two-dimensional porous nanosheets. In this reaction, nanoparticles of a fluorine-lanthanide compound are generated, and the nanoparticles are spontaneously assembled in a two-dimensional direction to form two-dimensional porous nanosheets. By adjusting the concentration of the reactant, the reaction time, etc., the assembly speed of the nanoparticles is regulated, so that regulation of the porosity of the nano-material is realized.

In a preferred embodiment, the concentration of the aqueous solution of fluorine-containing salt is in a range of 5 to 100 mg/mL. However, it should be understood that the concentration of the aqueous solution of fluorine-containing salt can also be 15, 25, 35, 45, 60, 70, 80, 90, etc., and can be selected from the above range by those skilled in the art according to the actual reaction conditions. To further facilitate the generation of the fluorine-lanthanide compound, the concentration of the aqueous solution of fluorine-containing salt is more preferably in a range of 10 to 50 mg/mL, further preferably in a range of 20 to 30 mg/mL.

In a preferred embodiment, a molar ratio of the fluorine in the aqueous solution of fluorine-containing salt to the lanthanide in the mixed solution is in a range of 0.1-10:1. However, it should be understood that the molar ratio of the fluorine in the aqueous solution of fluorine-containing salt to the lanthanide in the mixed solution can also be 0.5:1, 0.8:1, 1:1, 2:1, 4:1, 5:1, etc., and can be adjusted within the above range by those skilled in the art. The molar ratio of the fluorine in the aqueous solution of fluorine-containing salt to the lanthanide in the mixed solution is more preferably in a range of 0.3-3:1.

In a preferred embodiment, the fluorine-containing salt comprises one or more of ammonium fluoride, sodium fluoride, potassium fluoride, potassium fluoroborate, potassium fluorosilicate and tetrabutylammonium fluoride. When the fluorine-containing salt is a mixture, the amount of each fluorine-containing salt in the mixture is not specifically limited, and a mixture in any ratio is usable.

The addition speed of the aqueous solution of fluorine-containing salt is not specifically limited in the present application.

In the present application, a time for the precipitation reaction is preferably in a range of 0.5 h to 24 h, more preferably in a range of 2 h to 20 h, further preferably in a range of 4 h to 12 h and most preferably in a range of 5 h to 10 h. In the present application, the precipitation reaction is preferably carried out while stirring, and the rotation speed of stirring is not specifically limited in the present application.

After the precipitation reaction is completed, in the present application, the resultant of the precipitation reaction is preferably subjected to solid-liquid separation and drying successively to obtain lanthanide fluoride two-dimensional porous nanosheets. In the present application, the solid-liquid separation is preferably centrifugal separation, and the time and rotation speed of the centrifugal separation are not specifically limited in the present application as long as the solid resultant can be separated and obtained.

After the solid resultant is obtained, in the present application, the solid product is preferably dried to obtain lanthanide fluoride two-dimensional porous nanosheets. In the present application, the drying is preferably freeze-drying, and the time and temperature for the freeze-drying are not specifically limited in the present application as long as the moisture in the solid resultant can be removed.

Figure 4:
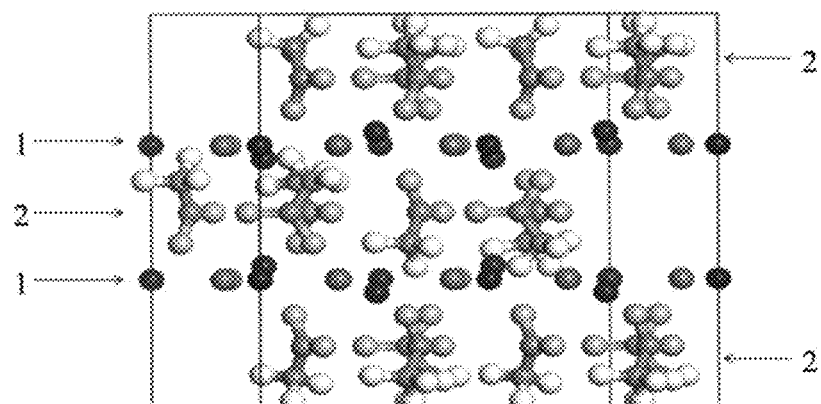
FIG. 4 is a schematic structure diagram of cerium fluoride (F—Ce) two-dimensional porous nanosheets prepared by Embodiment 1 of the present application.
Figure 4:
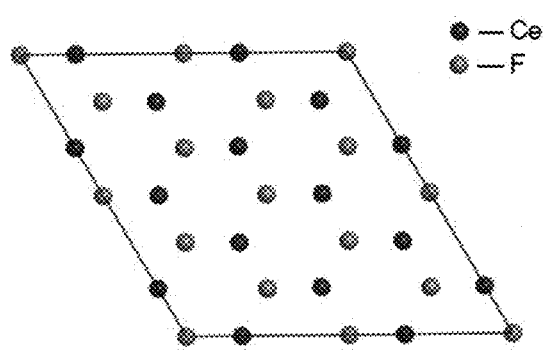

Another aspect of the present application provides lanthanide fluoride two-dimensional porous nanosheets prepared by the preparation method described above, wherein the lanthanide fluoride two-dimensional porous nanosheets are formed by alternately stacking fluorine-lanthanide metal monoatomic layers and interlayer acetates, and an average pore diameter of the lanthanide fluoride two-dimensional porous nanosheets is in a range of 0.1 to 30 nm. By taking F—Ce two-dimensional porous nanosheets as example, FIG. 4(a) shows a stereoscopically structure diagram and FIG. 4(b) is a top view of the F—Ce atom layers in FIG. 4(a).

Preferably, the average pore diameter of the lanthanide fluoride two-dimensional porous nanosheets is in a range of 0.1 to 10 nm.

In a preferred embodiment, the lanthanide fluoride two-dimensional porous nanosheets are formed by assembling nanoparticles of 0.5-20 nm in diameter.

Still another aspect of the present application also provides applications of the lanthanide fluoride two-dimensional porous nanosheets in adsorption, catalysis, battery materials and gas separation.

In the present application, if the lanthanide fluoride two-dimensional porous nanosheets are applied in the adsorption process for dye, the dye is preferably an anionic dye based on the characteristic of positive charge of the prepared material.

In the present application, the adsorption process for dye is preferably adsorption for dye in wastewater, the volume of the wastewater is preferably in a range of 10 to 500 mL, the concentration of dye in the wastewater is preferably in a range of 100 mg/L to 2000 mg/L, the amount of an adsorbent is preferably in a range of 0.01 g to 1.0 g, and the adsorption time is preferably in a range of 0.5 h to 3 h. Wherein, the adsorbent is the lanthanide fluoride two-dimensional porous nanosheets as described above.

In the present application, if the lanthanide fluoride two-dimensional porous nanosheets are applied in catalytic reaction, and when the selected lanthanide metal salt contains cerium, the prepared nanosheets are porous and contain trivalent cerium ions, the catalytic reaction is preferably catalytic degradation of phenol-containing wastewater, and the nanosheets are used as a catalyst in the catalytic reaction.

In the catalytic reaction described above, the volume of the phenol-containing wastewater is preferably in a range of 10 mL to 500 mL, the concentration of phenol pollutants in the wastewater is preferably in a range of 50 mg/L to 500 mg/L, the amount of the catalyst is preferably in a range of 0.01 g to 1.0 g, and the time for catalytic degradation is preferably in a range of 0.5 h to 10 h.

The nanosheets of the present application are applicable to gas separation, for example, separation of carbon dioxide from methane gas or separation of other gases.

The nanosheets of the present application are applicable to battery materials, for example, preparation of desired battery diaphragms or other battery materials. The lanthanide fluoride two-dimensional porous nanosheets and the preparation method and application thereof in the present application will be described below in detail by embodiments, but these embodiments should not be interpreted as limitations to the protection scope of the present application.

Embodiment 1

Figure 2:
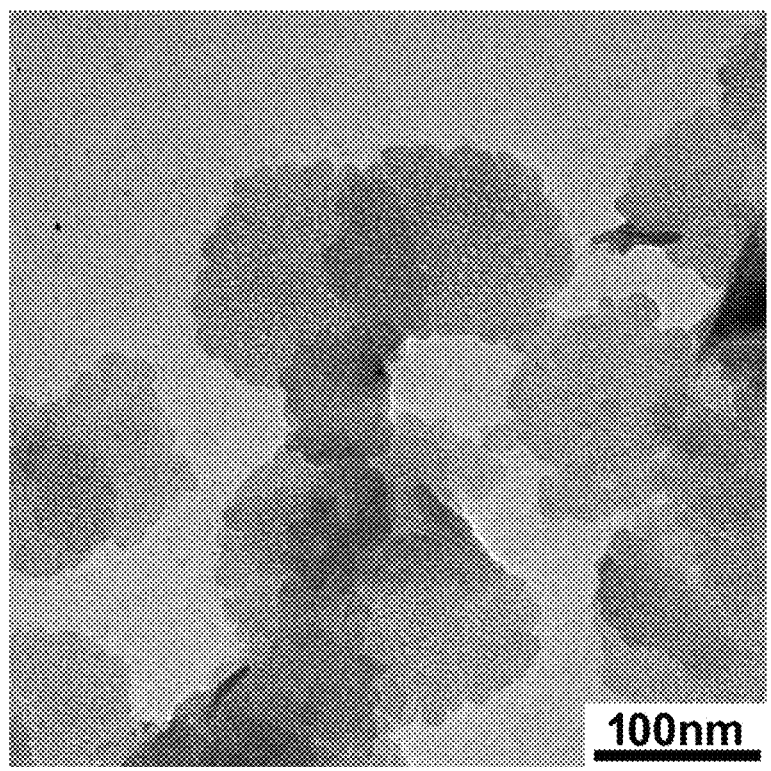
FIG. 2 is a transmission electron microphotograph of cerium fluoride (F—Ce) two-dimensional porous nanosheets prepared by Embodiment 1 of the present application.
Figure 3:
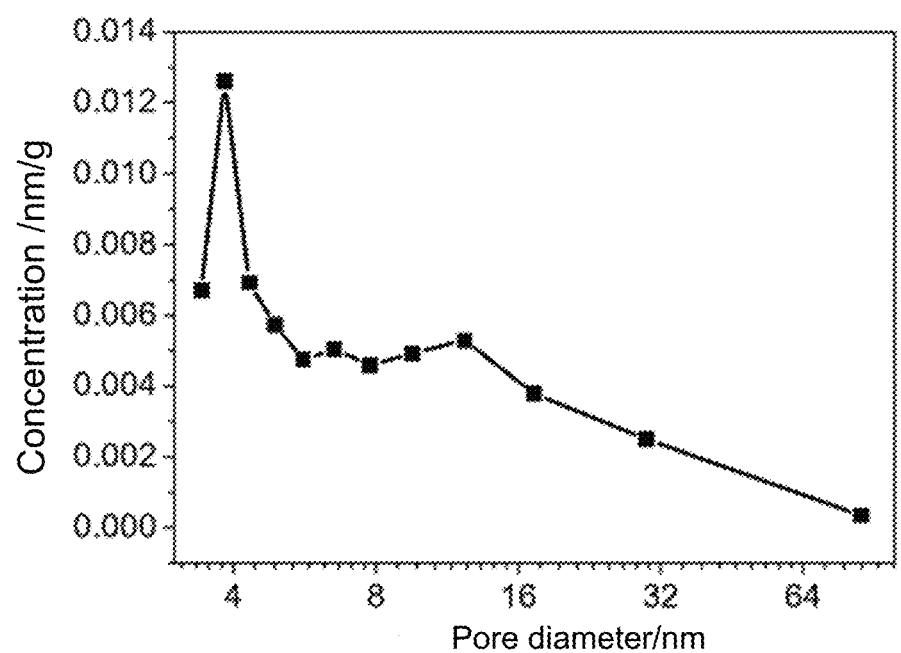
FIG. 3 is a pore diameter distribution of cerium fluoride (F—Ce) two-dimensional porous nanosheets prepared by Embodiment 1 of the present application.

Pure water (300 mL) was added in a three-necked flask and blown with nitrogen for 20 min, and then 3.6 mmol of cerium nitrate and 3.6 mmol of sodium acetate solid powder were added successively, wherein the molar ratio of cerium nitrate to sodium acetate was 1:1. After dissolution by stirring, 20 mL of 5 mg/mL aqueous solution of ammonium fluoride was added to the aqueous solution containing cerium nitrate (where the molar ratio of fluorine ions to cerium ions was 0.5:1) and was kept stirring for 2 h. Finally, cerium fluoride (F—Ce) two-dimensional porous nanosheets were obtained after centrifugation and freeze-drying. The field-emission electron microphotograph of the cerium fluoride (F—Ce) two-dimensional porous nanosheets prepared in this embodiment was shown in FIG. 1. It could be clearly observed from FIG. 1 that a large number of two-dimensional nanosheets were stacked together. The transmission electron microphotograph in FIG. 2 reconfirmed that the resultant prepared in this embodiment was cerium fluoride (F—Ce) two-dimensional nanosheets. A nitrogen adsorption/desorption test was performed on the cerium fluoride (F—Ce) nanosheets, and the distribution of pore diameters of the nanosheets was calculated, as shown in FIG. 3. The results indicated that the nanosheets prepared in this embodiment were porous nanosheets and had an average pore diameter of 3.832 nm.

A method for evaluating the adsorption performance of the nanosheets prepared in this embodiment was as follows: 100 mL of 1500 mg/L Congo red solution was added in a 250 mL reaction vessel, and 0.03 g of the cerium fluoride (F—Ce) two-dimensional porous nanosheets prepared in this embodiment was then added, so that the adsorption test of the nanosheets for the Congo red dye was initiated. Samples were taken and the concentration of dye was measured every 10 min. The time of the adsorption of the cerium fluoride (F—Ce) two-dimensional porous nanosheets prepared in this embodiment for the Congo red dye was 2 h, and the maximum adsorption capacity could be 2880 mg/g.

Embodiment 2

200 mL of pure water was added in a three-necked flask and blown with nitrogen for 30 min, and then 1.2 mmol of cerium acetate and 3.6 mmol of sodium acetate solid powder were added successively, wherein the molar ratio of cerium acetate to sodium acetate was 1:3. After dissolution by stirring, the 50 mL of 10 mg/mL sodium fluoride solution was added to the aqueous solution containing cerium acetate (where the molar ratio of fluorine ions to cerium ions was 0.7:1) and was kept stirring for 4 h. Finally, cerium fluoride (F—Ce) two-dimensional porous nanosheets were obtained after centrifugation and freeze-drying.

Embodiment 3

200 mL of pure water was added in a three-necked flask and blown with nitrogen for 10 min, and then 1 mmol of praseodymium chloride and 5 mmol of sodium acetate solid powder were added successively, wherein the molar ratio of praseodymium chloride to sodium acetate was 1:5. After dissolution by stirring, 80 mL of 30 mg/mL potassium fluoride solution was added to the aqueous solution containing praseodymium chloride (where the molar ratio of fluorine ions to praseodymium ions was 1:1) and was kept stirring for 8 h. Finally, praseodymium fluoride (F—Pr) two-dimensional porous nanosheets were obtained after centrifugation and freeze-drying.

Embodiment 4

50 mL of pure water was added in a three-necked flask and blown with nitrogen for 40 min, and then 0.5 mmol of lanthanum chlorate and 4 mmol of sodium acetate solid powder were added successively, wherein the molar ratio of lanthanum chlorate to sodium acetate was 1:8. After dissolution by stirring, 100 mL of 40 mg/mL potassium fluoroborate solution was added to the aqueous solution containing lanthanum chlorate (where the molar ratio of fluorine ions to lanthanum ions was 0.8:1) and was kept stirring for 12 h. Finally, lanthanum fluoride (F—La) two-dimensional porous nanosheets were obtained after centrifugation and freeze-drying.

Embodiment 5

100 mL of pure water was added in a three-necked flask and blown with nitrogen for 60 min, and then 0.3 mmol of neodymium chloride and 3 mmol of sodium acetate solid powder were added successively, wherein the molar ratio of neodymium chloride to sodium acetate was 1:10. After dissolution by stirring, 50 mL of 50 mg/mL tetrabutylammonium fluoride solution was added to the aqueous solution containing neodymium chloride (where the molar ratio of fluorine ions to neodymium ions was 1.5:1) and was kept stirring for 16 h. Finally, neodymium fluoride (F—Nd) two-dimensional porous nanosheets were obtained after centrifugation and freeze-drying.

Embodiment 6

360 mL of pure water was added in a three-necked flask and blown with nitrogen for 30 min, and then 1.2 mmol of ytterbium nitrate and 9.6 mmol of sodium acetate solid powder were added successively, wherein the molar ratio of ytterbium nitrate to sodium acetate was 1:8. After dissolution by stirring, was added with 50 mL of 50 mg/mL potassium fluosilicate solution was added to the aqueous solution containing ytterbium nitrate (where the molar ratio of fluorine ions to ytterbium ions was 3:1) and was kept stirring for 8 h. Finally, ytterbium fluoride (F—Yb) two-dimensional porous nanosheets were obtained after centrifugation and freeze-drying.

Embodiment 7

240 mL of pure water was added in a three-necked flask and blown with nitrogen for 60 min, and then 0.4 mmol of erbium nitrate and 2 mmol of sodium acetate solid powder were added successively, wherein the molar ratio of erbium nitrate to sodium acetate was 1:5. After dissolution by stirring, 50 mL of 50 mg/mL tetrabutylammonium fluoride solution was added to the aqueous solution containing erbium nitrate (where the molar ratio of fluorine ions to erbium ions was 3:1) and was kept stirring for 20 h. Finally, erbium fluoride (F—Er) two-dimensional porous nanosheets were obtained after centrifugation and freeze-drying.

Embodiment 8

80 mL of pure water was added in a three-necked flask and blown with nitrogen for 30 min, and then cerium nitrate, praseodymium nitrate and sodium acetate solid powder were added successively, wherein the molar ratio of nitrates (the sum of the molar number of cerium nitrate and the molar number of praseodymium nitrate is 1 mmol) to sodium acetate was 1:8. After dissolution by stirring, 100 mL of 20 mg/mL ammonium fluoride solution was added to the aqueous solution containing cerium nitrate and praseodymium nitrate (where the molar ratio of fluorine ions to the sum of cerium and praseodymium ions was 2:1) and was kept stirring for 24 h. Finally, cerium praseodymium fluoride (F—Ce—Pr) two-dimensional porous nanosheets were obtained after centrifugation and freeze-drying.

Embodiment 9

200 mL of pure water was added in a three-necked flask and blown with nitrogen for 30 min, and then cerium nitrate, neodymium nitrate, erbium nitrate and sodium acetate solid powder were added successively, wherein the molar ratio of nitrates (the sum of the molar number of cerium nitrate, the molar number of neodymium nitrate and the molar number of erbium nitrate is 1.5 mmol) to sodium acetate was 1:10. After dissolution by stirring, 100 mL of 50 mg/mL sodium fluoride solution was added to the aqueous solution containing cerium nitrate, neodymium nitrate and erbium nitrate (where the molar ratio of fluorine ions to the sum of cerium, neodymium and erbium ions was 5:1) and was kept stirring for 24 h. Finally, cerium neodymium erbium fluoride (F—Ce—Nd—Er) two-dimensional porous nanosheets were obtained after centrifugation and freeze-drying.

Embodiment 10

120 mL of pure water was added in a three-necked flask and blown with nitrogen for 30 min, and then cerium chloride, praseodymium chlorate, erbium nitrate and sodium acetate solid powder were added successively, wherein the molar ratio of the precursor salt (the sum of the molar number of cerium chloride, the molar number of praseodymium chlorate and the molar number of erbium nitrate is 1.2 mmol) to sodium acetate was 1:5. After dissolution by stirring, 30 mL of 50 mg/mL potassium fluoride solution was added to the aqueous solution containing cerium chloride, praseodymium chlorate and erbium nitrate (where the molar ratio of fluorine ions to the sum of cerium, praseodymium and erbium ions was 2:1) and was kept stirring for 12 h. Finally, cerium praseodymium erbium fluoride (F—Ce—Pr—Er) two-dimensional porous nanosheets were obtained after centrifugation and freeze-drying.

Embodiment 11

480 mL of pure water was added in a three-necked flask and blown with nitrogen for 90 min, and then lanthanum chloride, cerium nitrate, neodymium nitrate and sodium acetate solid powder were added successively, wherein the molar ratio of the precursor salt (the sum of the molar number of lanthanum chloride, the molar number of cerium nitrate and the molar number of neodymium nitrate is 3.6 mol) to sodium acetate was 1:7. After dissolution by stirring, 70 mL of 30 mg/mL potassium fluoride solution was added to the aqueous solution containing lanthanum chloride, cerium nitrate and neodymium nitrate (where the molar ratio of fluorine ions to the sum of lanthanum, cerium and neodymium ions was 0.7:1) and was kept stirring for 18 h. Finally, lanthanum cerium neodymium fluoride (F—La—Ce—Nd) two-dimensional porous nanosheets were obtained after centrifugation and freeze-drying.

As for the lanthanide fluoride two-dimensional porous nanosheets prepared in the Embodiments 2-11, if applied to the adsorption for dye, the maximum adorption capacity of the nanosheets for Congo red dye is between 92 mg/g and 3051 mg/g, if applied to catalytic reaction, the degradation rate for the phenol-containing wastewater can reach 70% to 98%.

The aforementioned description merely shows the preferred implementations of the present application. It should be pointed out that, to one person of ordinary skill in the art, various improvements and modifications can be made without departing from the principle of the present application, and these improvements and modifications shall be deemed as falling into the protection scope of the present application.

The invention claimed is:

1. A method for preparing lanthanide fluoride two-dimensional porous nanosheets, comprising the following steps of:
   (1) mixing a water-soluble lanthanide metal salt and an aqueous solution of sodium acetate in a nitrogen atmosphere to obtain a mixed solution; and
   (2) adding an aqueous solution of fluorine-containing salt to the mixed solution obtained in the step (1) for precipitation reaction to produce lanthanide fluoride two-dimensional porous nanosheets.

2. The method according to claim 1, wherein the water-soluble lanthanide metal salt in the step (1) comprises one or more of nitrates, chlorates, chlorides and acetates of lanthanides.

3. The method according to claim 2, wherein the water-soluble lanthanide metal salt is selected from the group consisting of cerium nitrate, cerium acetate, praseodymium chloride, lanthanum chlorate, neodymium chloride, ytterbium nitrate, erbium nitrate, praseodymium nitrate, neodymium nitrate, cerium chloride, praseodymium chlorate and mixtures thereof.

4. The method according to claim 3, wherein the mixtures are a mixture of cerium nitrate and praseodymium nitrate, a mixture of cerium nitrate, neodymium nitrate and erbium nitrate, a mixture of cerium chloride, praseodymium chlorate and erbium nitrate, or a mixture of lanthanum chlorate, cerium nitrate and neodymium nitrate.

5. The method according to claim 4, wherein a molar ratio of the water-soluble lanthanide metal salt to the sodium acetate is in a range of 1:1 to 1:10.

6. The method according to claim 3,
   wherein a molar ratio of the water-soluble lanthanide metal salt to the sodium acetate is in a range of 1:1 to 1:10.

7. The method according to claim 2, wherein a molar ratio of the water-soluble lanthanide metal salt to the sodium acetate is in a range of 1:1 to 1:10.

8. The method according to claim 1, wherein a molar ratio of the water-soluble lanthanide metal salt to the sodium acetate is in a range of 1:1 to 1:10.

9. The method according to claim 1, wherein a concentration of the aqueous solution of fluorine-containing salt in the step (2) is in a range of 5 to 100 mg/mL.

10. The method according to claim 9, wherein a molar ratio of the fluorine in the aqueous solution of fluorine-containing salt to the lanthanide in the mixed solution in the step (2) is in a range of 0.1-10:1.

11. The method according to claim 9, wherein the fluorine-containing salt in the step (2) comprises one or more of ammonium fluoride, sodium fluoride, potassium fluoride, potassium fluoroborate, potassium fluorosilicate and tetrabutylammonium fluoride.

12. The method according to claim 1, wherein a molar ratio of the fluorine in the aqueous solution of fluorine-containing salt to the lanthanide in the mixed solution in the step (2) is in a range of 0.1-10:1.

13. The method according to claim 1, wherein the fluorine-containing salt in the step (2) comprises one or more of ammonium fluoride, sodium fluoride, potassium fluoride, potassium fluoroborate, potassium fluorosilicate and tetrabutylammonium fluoride.

14. The method according to claim 1, wherein a time for the precipitation reaction in the step (2) is in a range of 0.5 h to 24 h.

15. Lanthanide fluoride two-dimensional porous nanosheets prepared by the method of claim 1, wherein the lanthanide fluoride two-dimensional porous nanosheets comprise alternately stacked fluorine-lanthanide metal monoatomic layers and interlayer acetates, and an average pore diameter of the lanthanide fluoride two-dimensional porous nanosheets is in a range of 0.1 to 30 nm.

16. The lanthanide fluoride two-dimensional porous nanosheets according to claim 15, wherein the average pore diameter of the lanthanide fluoride two-dimensional porous nanosheets is in a range of 0.1 to 10 nm.

17. The lanthanide fluoride two-dimensional porous nanosheets according to claim 15, wherein the lanthanide fluoride two-dimensional porous nanosheets comprise nanoparticles of 0.5-20 nm in diameter.

18. The lanthanide fluoride two-dimensional porous nanosheets according to claim 16, wherein the lanthanide fluoride two-dimensional porous nanosheets comprise assembled nanoparticles of 0.5-20 nm in diameter.

* * * * *